United States Patent [19]
Ohishi

[11] 3,926,217
[45] Dec. 16, 1975

[54] FLUID LOGIC PROGRAMMER
[75] Inventor: Masateru Ohishi, Kobe, Japan
[73] Assignee: Konan Electric Company, Ltd., Japan
[22] Filed: Aug. 13, 1973
[21] Appl. No.: 387,695

[52] U.S. Cl. ...... 137/596.18; 137/627.5; 137/552.5; 137/624.11
[51] Int. Cl.² ......................................... F16K 11/00
[58] Field of Search ....... 137/596.18, 596.14, 625.6, 137/627.5, 628, 630.16, 614.19, 613, 596.17, 596, 269; 251/366

[56] References Cited
UNITED STATES PATENTS

| | | | |
|---|---|---|---|
| 1,884,179 | 10/1932 | Parks | 137/596.18 |
| 2,064,795 | 12/1936 | Gerdts | 137/613 X |
| 2,634,750 | 4/1953 | Raffa | 137/627.5 X |
| 2,722,233 | 11/1955 | Schneck | 137/596.18 |
| 2,999,513 | 9/1961 | Oetiker | 137/627.5 X |
| 3,262,464 | 7/1966 | Frantz | 251/63 X |

*Primary Examiner*—Martin P. Schwadron
*Assistant Examiner*—Robert J. Miller
*Attorney, Agent, or Firm*—Wenderoth, Lind & Ponack

[57] ABSTRACT

A fluid logic programmer for programming fluid controlled slave machines to enable the function, sequence or timing thereof to be accurately and rapidly varied, which comprises an aggregation of fluid logic valve assemblies. Each fluid logic valve assembly comprises a combined pair of manually operable and fluidly operable valve sections. Fluid under pressure from a fluid source flows through the fluid logic valve assembly to a corresponding one of the slave machines only when the manually operable valve section is set in position to communicate with the fluidly operable valve section. The fluid logic valve assembly is also provided with means for relieving or exhausting fluid pressure present in an fluid outlet circuit between the programmer and the slave machine when the manually operable valve section is set in position not to communicate with the fluidly operable valve section.

6 Claims, 13 Drawing Figures

FLUID LOGIC PROGRAMMER

BACKGROUND OF THE INVENTION

The present invention broadly relates to a fluid logic system and, more particularly, to a fluid logic programmer for programming fluid-controlled slave machines to enable the function, sequence or timing thereof to be accurately and rapidly varied, by altering or adjusting the fluid circuits thereto emanating from at least one fluid supply source which feeds fluid medium under pressure into the programmer and which selectively directs the fluid medium through desired outlet circuits for the fluid medium to the slave machine to be controlled.

The present invention also pertains to a fluid logic valve assembly for use in the fluid logic programmer of the type above referred to, which is capable of exhausting residual fluid medium present in any of the outlet circuits associated with the slave machine or machines not operated.

It is well understood by those skilled in the art that the fluid logic programmer to which the present invention pertains comprises an aggregation of fluid logic valves operable in individually predetermined valving modes according to the planned programme.

According to the prior art, because of the construction of each fluid logic valve, the programmer can not accommodate different planned programmes. In other words, because the mode of operation of each fluid logic valve is fixed, the programmer, which comprises an aggregation of such fluid logic valves, merely function to control the slave machines in a single sequence determined by a certain planned programme. This type of fluid logic programmer has a disadvantage in that it cannot be used in association with the slave machines when the latter are intended to be operated in a different sequence according to a different planned programme. This leads to the provision of many differently designed fluid logic programmers, equal to the number of planned programmes possibly required for a single set of slave machines to be controlled thereby.

It is accordingly clear that the provision of a number of the differently designed fluid logic programmers with respect to a single set of slave machines to be controlled thereby requires not only an increase in space for storing them, but also involves an increase of the costs involved in maintenance thereof, purchase thereof and so on.

Furthermore, each fluid logic valve employed in the conventional fluid logic programmer is not provided with means for relieving or exhausting fluid pressure present in an fluid outlet circuit between the programmer and an associated one of the slave machines. The residual of fluid pressure in the fluid outlet circuit between the programmer and the associated slave machine often, unless otherwise reduced or removed, constitutes a cause for erroneous operation of the associated slave machine in a manner known to those skilled in the art.

SUMMARY OF THE INVENTION

Accordingly, an essential object of the present invention is to provide an improved fluid logic programmer having a versatility with respect to different planned programmes, according to which different sets of slave machines are to be individually controlled.

Another important object of the present invention is to provide an improved fluid logic programmer of the type above referred to, which substantially eliminates the above mentioned disadvantages inherent in the conventional programmer of a similar kind and which can be manufactured at a relatively low cost with no substantial difficulty.

A further object of the present invention is to provide an improved fluid logic programmer of the type above referred to, which comprises an aggregation of fluid logic valves each capable of relieving or exhausting fluid pressure present in an associated one of fluid outlet circuits between said fluid logic valves and the corresponding slave machines when the associated one of the slave machines is rendered inoperative.

It is a related object of the present invention to provide an improved fluid logic valve assembly for use in the programmer of the type above referred to, which can be easily manufactured in a compact size.

It is another related object of the present invention to provide an improved fluid logic valve assembly wherein means is provided for relieving or exhausting fluid pressure present in an fluid outlet circuit between the programmer and an associated one of the slave machines.

It is a further related object of the present invention to provide an improved fluid logic valve assembly which substantially comprises a combined pair of manually operable and fluid controlled valves functioning as a fluid AND element in cooperation with each other.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
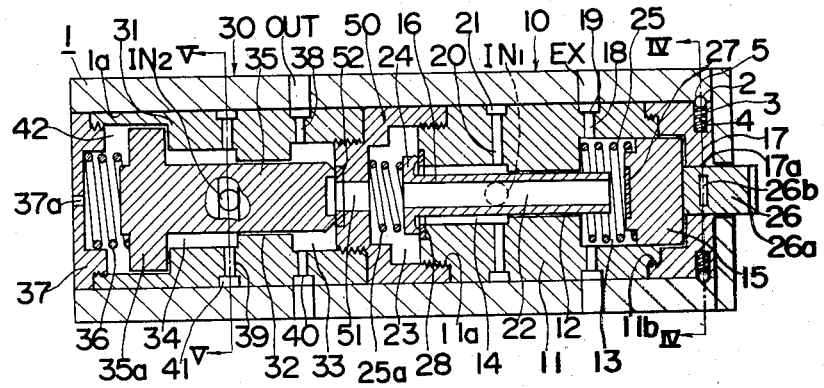
FIG. 1 is a longitudinal sectional view of a fluid logic valve assembly composed of a combined pair of manually operable and fluidly operable valves, constructed according to the present invention, with a portion being broken away to show a port element.

Before the description of the present invention proceeds, it is to be noted that like parts are designated by like reference numerals throughout the several views of the accompanying drawings. It is also to be noted that, in view of the fluid logic programmer according to the present invention utilizing a plurality of fluid logic valve assemblies having the same construction, description will be first made in connection with the details of one of the valve assemblies.

Referring now to FIGS. 1 to 5, the fluid logic valve assembly according to the present invention may be considered as composed of a combined pair of valve sections, one being manually operable and the other being fluidly operated, which are generally designated by 10 and 30, respectively. These two valve sections 10 and 30 are connected to each other by a valve coupler 50 and this valve coupler 50 should be understood as forming respective parts of the valve sections 10 and 30. As will become clear, these members 10, 30 and 50 may be housed within a single housing structure 1. However, since the housing structure 1 is not always necessary, the presence of the housing structure 1 will be temporarily neglected in the following description of the details of the fluid logic valve assembly.

As shown, the first or manually operable valve section 10 comprises a cylindrical block 11 having both ends formed with male threads 11a and 11b and also having an axial opening 12 extending in alignment with the longitudinal axis of said block 11. This axial opening 12 has both ends enlarged in different diameter thereby forming respective fluid chambers 13 and 14 in cooperation with a plunger 15, housed within said fluid chamber 13 in such a manner as will be described, and a hollow valving rod 16 which is arranged in such a manner as will be described later.

Figure 5:
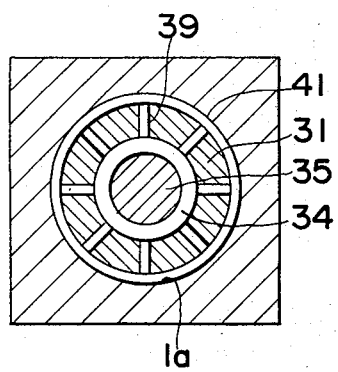
FIG. 5 is a cross sectional view taken along the line V—V in FIG. 1, FIGS. 6 to 8 are graphic symbols of the fluid logic valve assembly according to the present invention, shown in various positions corresponding respectively to FIGS. 1 to 3.

The fluid chamber 13 is confined, with the plunger 15 in, by a closure member 17 threaded to the threaded end 11b of the block 11. This fluid chamber 13 is communicated with the atmosphere through a plurality of passages 18 formed in the block 11 and radially outwardly extending from the fluid chamber 13 in equidistantly spaced relation with respect to each other in a similar fashion as shown in FIG. 5. Outer openings of these passages 18 are communicated with each other by an annular groove 19 formed around the cylindrical block 11.

Similarly, the fluid chamber 14 is communicated with the atmosphere through a plurality of passages 20 formed in the block 11 and radially outwardly extending from the fluid chamber 14 in equidistantly spaced relation with respect to each other. Outer openings of these passages 20 are communicated with each other by an annular groove 21 formed around the cylindrical block 11.

The hollow valving rod 16 is slidably, but fluidly tightly, extending through the axial opening 12 and has one end situated within the fluid chamber 13 and a portion adjacent to the other end thereof situated within the fluid chamber 14. This hollow valving rod 16 has a fluid passage 22 formed therein in alignment with the longitudinal axis thereof and having one end open towards the fluid chamber 13 and the other end open towards a fluid chamber 23 defined between the block 11 and the valve coupler 50 threaded to the threaded end 11a of the block 11. The end extremity of the hollow valving rod 16 adjacent to said other end of said fluid passage 22 is formed with a radially outward flange 24 of substantially convex-shaped cross section, as shown, which serves as a valving member for selectively opening and closing the annular open end of the fluid chamber 14 facing towards said radially outward flange 24.

Both the plunger 15 and the hollow valving rod 16 are biased in the same direction to the right by compression springs 25 and 25a respectively housed within the fluid chambers 13 and 23. In this condition, the plunger 15 is abutted against the inner face of the closure member 17 while the radially outward flange 24 is abutted against the end face of the threaded end 11a of the block 11, thereby closing the annular open end of the fluid chamber 14. It is to be noted that, in the above mentioned condition, a space is provided between the open end of the hollow valving rod 16 situated within the fluid chamber 13 and one end face of the plunger 15 facing towards said open end of the hollow valving rod 16.

Figure 2:
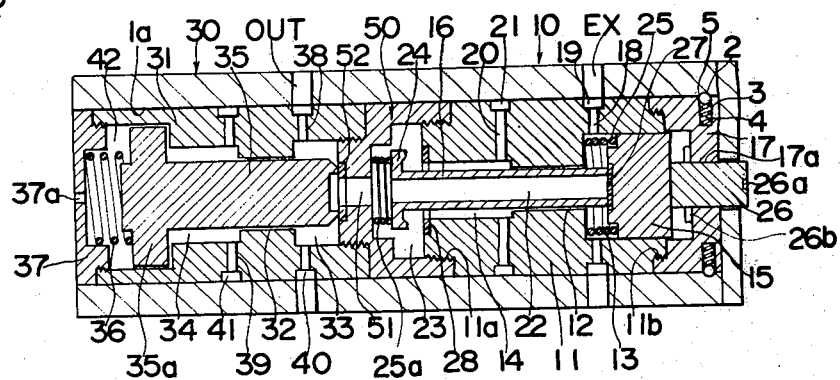
FIG. 2 is a similar view to FIG. 1, showing the fluid logic valve assembly having the manually operable valve conditioned in one position.
Figure 4:
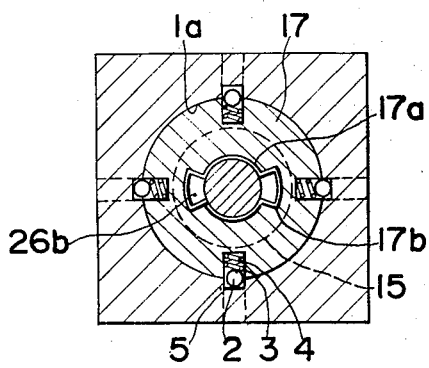
FIG. 4 is a cross sectional view taken along the line IV—IV in FIG. 1.

Slidably extending through a through hole 17a formed in the closure member 17 in alignment with the longitudinal axis of the block 11 is an actuating member 26 having one end rigidly connected, or otherwise integrally formed, with the plunger 15 and the other end situated outside the closure member 17 and formed with a key groove 26a. As shown in FIG. 4, the through hole 17a is shaped substantially as shown and having a pair of opposed guide grooves, generally indicated by 17b, along which segmental projections 26b rigidly mounted on the actuating member 26 are respectively guided. These segmental projections 26b on the actuating member 26 are, so long as the plunger 15 is biased to the right by the action of the compression spring 25, situated halfway within the guide grooves 17b and, when said actuating member 26 is pressed towards the left by the application of an external pushing force against the compression spring 25 and is subsequently turned about the axis of said actuating member 26, the segmental projections 26b engage the inner surface of the closure member 17 as shown in FIG. 2 and, therefore, the plunger 15 is locked in position with the compression spring 25 in a compressed state. It is to be noted that the key groove 26a on the end face of the actuating member 26 visually represents the positioning of the segmental projections 26b.

Round and annular elastic seat members are nondetachably provided as at 27 and 28, respectively, for reliably ensuring firm closure of the open end of the fluid passage 22 facing towards the plunger 15 and of the annular open end of the fluid chamber 14, which is achieved in a manner as will be hereinafter described.

The annular open end of the fluid chamber 14 facing towards the fluid chamber 23 is opened when the hollow valving rod 16 is moved to the left against the compression spring 25a. According to the present invention, this movement of the hollow valving rod 16 towards the left is achieved only by the application of an external pushing force to the actuating member 26. More specifically, if the external pushing force is applied to the actuating member 26 and subsequently the actuating member 26 is turned about the axis thereof, the plunger 15 in contact with the actuating member 26 is moved to the left against the compression spring 25 and locked in that position with the compression spring 25 in the compressed state. During movement of the plunger 15 to the left, the elastic seal member 27 on the end face of the plunger 15 closes the open end of the fluid passage 22 in the hollow valving rod 16 and, as the plunger 15 is further moved to the left, the plunger 15 causes the hollow valving rod 16 to move to the left against the compression spring 25a. Opening of the annular open end of the fluid chamber 14 takes place immediately after the hollow valving rod 16 has commenced to move towards the left with the radially outward flange 24 disengaging from the elastic seal member 28 on the end face of the threaded end 11a of the block. This condition is illustrated in FIG. 2.

On the other hand, if the actuating member 26 that has been locked is released, it can be outwardly projected by the action of the compression spring 25 of which resilient force is transmitted thereto through the plunger 15. Hence, the hollow valving rod 16 is also moved to the right by the action of the compression spring 25a thus causing the radially outward flange 24 to close the annular open end of the fluid chamber 14.

Referring still to FIGS. 1 to 5, a second or fluidally operated valve section 30 comprises a cylindrical block 31 formed with an axial opening 32 extending in alignment with the longitudinal axis of said block 31. The axial opening 32 has both ends enlarged in different diameter thereby forming respective fluid chambers 33 and 34 in cooperation with the valve coupler 50 and a land 35a integrally formed on a piston 35. The piston 35 is slidably extended through the axial opening 32 and has one end situated within the fluid chamber 33 and the other end forming a seat for a compression spring 36 which is interposed between the land 35a and a closure member 37 threaded to one end of the cylindrical block 31, the other end of said block 31 being threaded to the valve coupler 50 which is in turn threaded to the cylindrical block 11.

The cylindrical block 31 is also formed with two sets of a plurality of fluid passages 38 and 39, all of these passages 38 and 39 being radially outwardly extending from the fluid chambers 33 and 34, respectively, in similar fashions as the fluid passages 18 and 20 in the cylindrical block 11. Likewisely, annular grooves 40 and 41 are formed on the outer periphery of the cylindrical block 31 and are respectively communicated with outer openings of the passages 38 and 39.

A space 42 between the closure member 37 and the piston 35 and within which the compression spring 36 is housed is communicated with the atmosphere through a hole 37a formed in the closure member 37 and is of a sufficient size to permit the piston 35 to move between first and second positions. The piston 35 is normally biased in one direction to the right by the action of the compression spring 36 and, therefore, the end extremity of said piston 35 remote from the land 35a is engaged to one end face of the valve coupler 50 facing towards the fluid chamber 33.

The valve coupler 50 is, as shown, formed with a fluid passage 51 in alignment with the longitudinal axis of either the hollow valving rod 16 or the piston 35 and is non-detachably provided with an elastic seat member 52 of annular shape which faces the end extremity of the piston 35 remote from the land 35a. This valve coupler 50 is not always necessary and may be omitted, in which case the end extremity of the piston 35 remote from the land 35a should be contacted to the radially outward flange 24 on the hollow valving rod 16, thereby closing the open end of the fluid passage 22 facing the piston 35 while the compression spring 25a is mounted around the piston 35. The cylindrical block 31 is, in this case, directly coupled to the cylindrical block 11.

Figure 3:
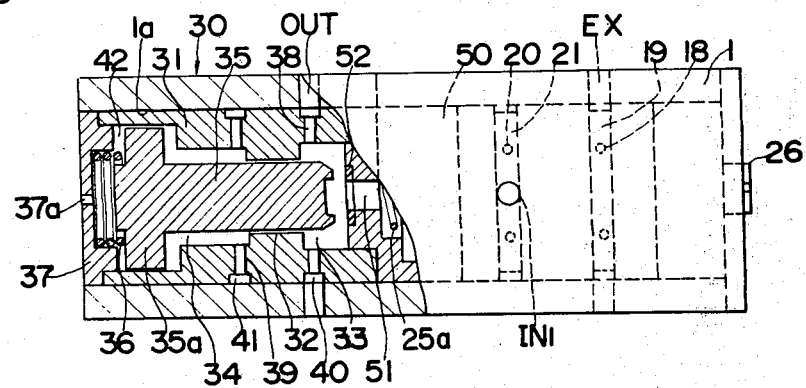
FIG. 3 is a longitudinal side view of the fluid logic valve assembly with a portion thereof being broken away to show the fluidly operable valve conditioned in one position.

The piston 35 is moved to the left against the compression spring 36 only when the fluid pressure applied to the land 35a of the piston 35 through the fluid chamber 34 overcomes the resilient force exerted by the compression spring 36. If the piston 35 is moved to the left as shown in FIG. 3 and the plunger 15 is not moved to the left, the fluid chambers 13 and 33 are communicated to each other through the fluid passage 22 in the hollow valving rod 16 and then the fluid passage 51 in the valve coupler 50. On the other hand, if the piston 35 is moved to the left and the plunger 15 is manually moved to the left, the fluid chambers 14 and 33 are communicated to each other through the fluid passage 51 while the open end of the fluid passage 22 is closed by said plunger 15. The hole 37a in the closure member 37 acts, during this movement of the piston 35, to selectively exhaust air in the space 41 and draw air into the space 34 thereby to facilitate the smooth movement of the piston 35.

Figure 11:
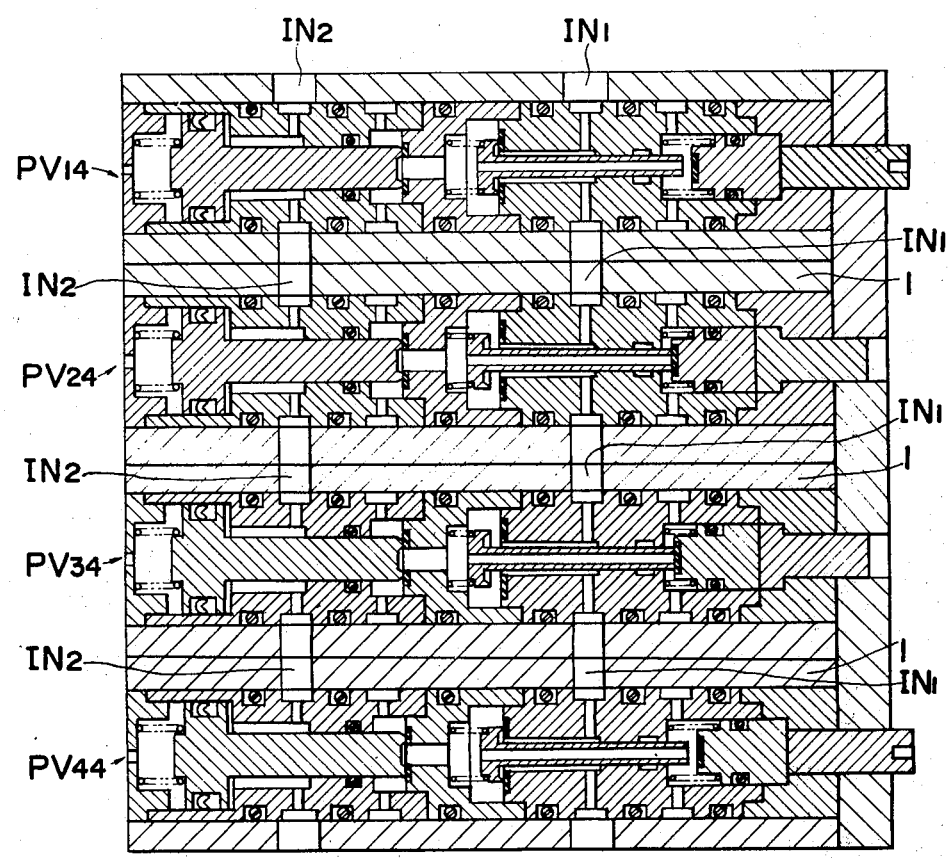
FIG. 11 is a side sectional view of the fluid logic valve assemblies stacked one over another thereby to build up the fluid logic programmer.

The fluid logic valve assembly thus constructed is housed within the housing structure 1 of substantially square cross section having an axial bore 1a formed therein in alignment with the longitudinal axis of said housing structure 1, said axial bore 1a having a diameter substantially equal to the outer diameter of the fluid logic valve assembly shown in FIGS. 1 to 3. This housing structure 1 is formed with two sets of each pair of ports EX and OUT open on one pair of opposed sides of the housing structure 1 and respectively communicated with the annular grooves 19 and 40 and also with two sets of each pair of ports $IN_1$ and $IN_2$ open on the other pair of opposed sides of the housing structure 1 90° spaced from the ports EX and OUT and respectively communicated with the annular grooves 21 and 41. Although not shown, for the purpose of avoiding fluid leakage, a suitable number of sealing rings are mounted on the cylindrical blocks 11 and 31 on both sides of each of the annular grooves 19, 21, 40 and 41 and this technique is a matter of design in the art. By way of example, disposition of these sealing rings are illustrated in FIG. 11 wherein four fluid logic valve assemblies, each being of the construction as hereinbefore described in details, are shown as connected side to side as will be described later.

For holding the valve assembly firmly in position within the housing structure 1, a detent mechanism is provided. This detent mechanism comprises, as shown in FIGS. 1, 2 and 4, a plurality of detent balls, generally indicated by 2, collapsibly housed within respective holes 3 formed, for example, in the closure member 17 in a radially outward direction and in equidistantly spaced relation with respect to each other as best shown in FIG. 4. A compression spring 4 is housed within each hole 3 and interposed between the detent ball 2 and the depth of each hole 3 for outwardly biasing the detent ball 2.

The detent mechnism further comprises recesses, generally indicated by 5, formed on the inner peripheral surface of the housing structure 1 which defines the bore 1a at a position corresponding to the closure member 17, the number of said recesses 5 being the same as the number of the detent balls 2 collapsibly engaged in the detent holes 3. These detent recesses 5 are adapted to partially receive therein the detent balls 2 when the valve assembly is inserted into the bore 1a of the housing structure 1.

Instead of employment of the detent mechanism of the construction above described, any of various methods for firmly holding the valve assembly in position within the housing structure 1 can be employed.

Figure 6:
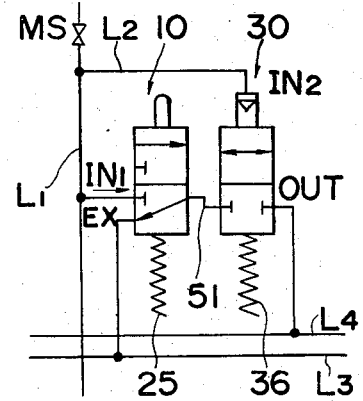
Figure 7:
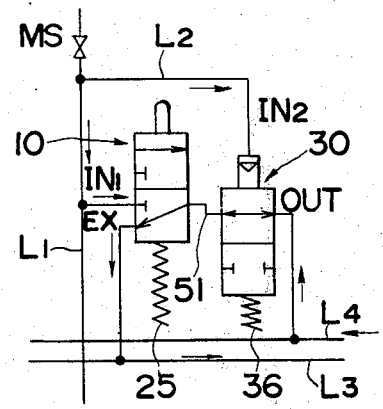
Figure 8:
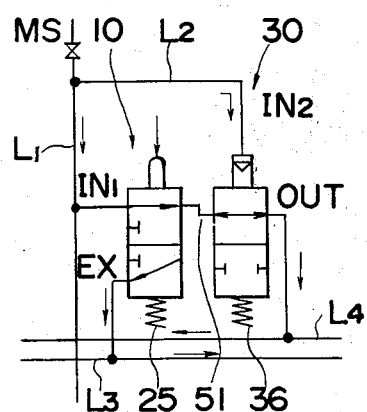

The fluid logic valve assembly shown in FIGS. 1 to 3 may be graphically depicted such as shown in FIGS. 6 to 8. As shown in FIGS. 6 to 8, the inlet ports $IN_1$ and $IN_2$ are communicated with a suitable fluid source by means of respective lines $L_1$ and $L_2$, the port EX with an exhaust line $L_3$ which may be connected with the fluid source through a fluid reservoir, and the port OUT with a slave machine (not shown) to be operated by means of a line $L_4$. In this arrangement, assuming that the manually operable valve section 10 is not operated and that fluid under pressure is supplied to the ports $IN_1$ and $IN_2$, only communication between the port OUT and the port EX is established, as shown in FIG. 7. This is possible because, while the first and second valve sections 10 and 30 are respectively conditioned as shown in FIGS. 1 and 3, only the passages 18 and 38 are communicated to each other as hereinbefore described. In this condition, if fluid pressure is present in the output line $L_4$, it can be advantageously exhausted to the exhaust line $L_3$ and then to the fluid source through the fluid reservoir. This condition of FIG. 7 will be hereinafter referred to as the fluid logic valve assembly being in closed position.

If the manually operable valve section 10 is subsequently operated while the fluidly operated valve section 30 is in the condition as shown in FIG. 3 or FIG. 7, the condition shown in FIG. 8 can be established wherein the ports $IN_1$ and OUT are communicated with each other while communication between the ports OUT and EX has been interrupted. This is possible because, while the first and second valve sections 10 and 30 are respectively conditioned as shown in FIGS. 2 and 3, only the passages 20 and 38 are communicated to each other as hereinbefore described. In this condition of FIG. 8, fluid under pressure that has been applied to the port $IN_1$ flows through the passage 51 on to the outlet port OUT and then to the slave machine to be operated thereby by means of the outlet line $L_4$. This condition of FIG. 8 will be hereinafter referred to as the fluid logic valve assembly being in open position.

Figure 9:
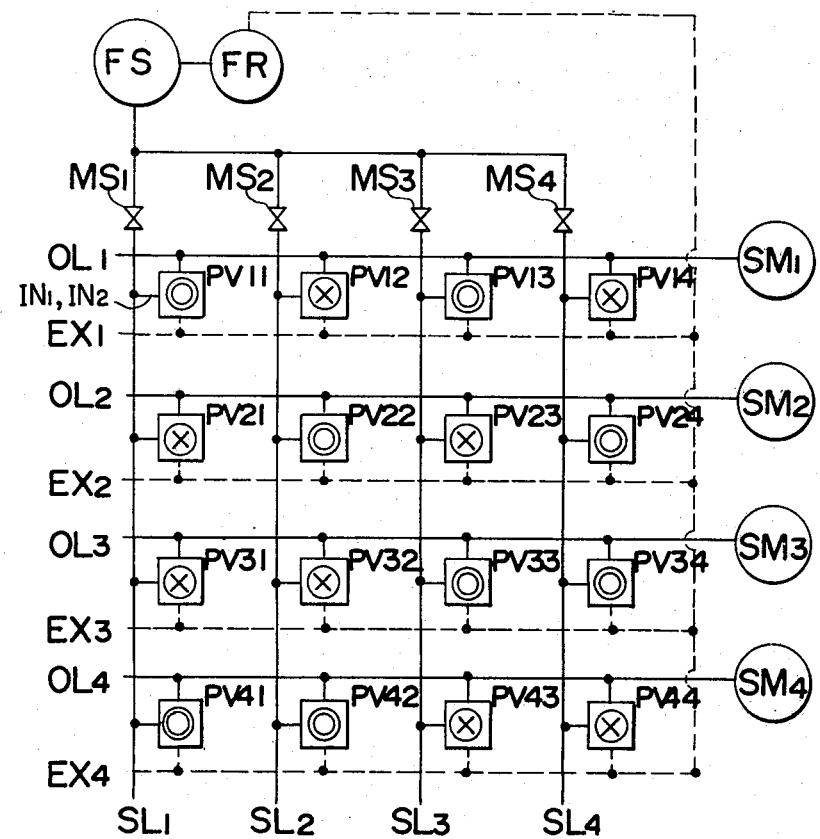
FIG. 9 is a schematic diagram showing one example of fluid circuit of a fluid logic programmer utilizing a plurality of fluid logic valve assemblies.

Referring now to FIG. 9, one example of the fluid logic programmer according to the present invention is shown. This fluid logic programmer is only for the purpose of illustration and is intended to sequentially control operation of, for example, four slave machines $SM_1$ to $SM_4$ according to a planned programme shown in FIG. 10. Firstly, the planned programme of FIG. 10 will be hereinafter described.

Time $T_1$: The slave machines $SM_1$ and $SM_4$ are to be operated.

Time $T_2$: Operation of the slave machine $SM_1$ is to be stopped while the slave machine $SM_2$ is to be operated.

Time $T_3$: Operation of the slave machines $SM_2$ and $SM_4$ are to be stopped while the slave machines $SM_1$ and $SM_3$ are to be operated.

Time $T_4$: Operation of the slave machine $SM_1$ is to be stopped while the slave machine $SM_2$ is to be operated.

Figure 10:
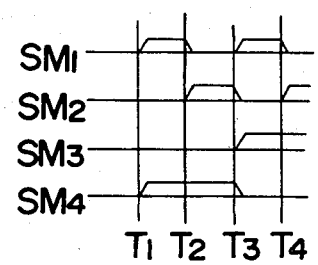
FIG. 10 is a chart showing valving modes of the respective fluid logic valve assemblies of the fluid logic programmer shown in FIG. 9.

Referring back to FIG. 9, in order to operate the slave machines in a predetermined sequence according to the planned programme shown in FIG. 10, the fluid logic programmer of the present invention comprises a plurality of rows of supply pipes $SL_1$ to $SL_4$ commonly connected to the fluid source FS through the respective master valves $MS_1$ to $MS_4$, these master valves merely functioning to selectively open and close the associated supply pipes. The fluid logic programmer further comprises lines of outlet pipes $OL_1$ to $OL_4$ in a number corresponding to the number of the rows of the supply pipes $SL_1$ to $SL_4$, which are respectively connected to the slave machines $SM_1$ to $SM_4$, and lines of exhaust pipes $EX_1$ to $EX_4$ which are connected to the fluid sources FS through the fluid reservoir FR. One fluid logic valve assembly is disposed for each intersecting point between the rows of the supply pipes $SL_1$ to $SL_4$ and the lines of the outlet pipes $OL_1$ to $OL_4$. Each valve assembly is of the construction as hereinbefore described with reference to FIGS. 1 to 3, in such a way that the ports $IN_1$ and $IN_2$ are connected with the supply pipe while the outlet port OUT is connected with the outlet pipe, the exhaust port EX being connected with the exhaust pipe, substantially as shown. It is to be noted that the circle and cross depicted in the blocks which represent the respective fluid logic valve assemblies designate the fluid logic valves in the open and closed positions, respectively.

In the arrangement of FIG. 9, it is clear that the fluid logic programmer according to the present invention functions to control the slave machines $SM_1$ to $SM_4$ in the manner as shown in FIG. 10. It is also to be noted that the master valves $MS_1$ to $MS_4$ are successively opened at the respective times $T_1$, $T_2$, $T_3$ and $T_4$ while the master valve or valves that has or have been previously opened are closed. This can be easily achieved, either manually or by the use of an electromagnetic device, in any known manner.

FIG. 11 illustrates how the row of the fluid logic valve assemblies, for example, those designated by PV14, PV24, PV34 and PV44, are integrated for the fluid logic programmer according to the present invention. As shown, the housing structures 1, each with the fluid logic valve assembly therein, are arranged side by side with the ports $IN_1$ and $IN_2$ of one housing structure aligned with the ports $IN_1$ and $IN_2$ of the next adjacent housing structure. All of these fluid logic valve assemblies PV11 to PV14, PV21 to PV24, PV31 to PV34, and PV41 to PV44 may be connected to one another in a similar manner as shown in FIG. 11 and may be tied together by the use of a suitable number of clamping bands (not shown).

Figure 12:
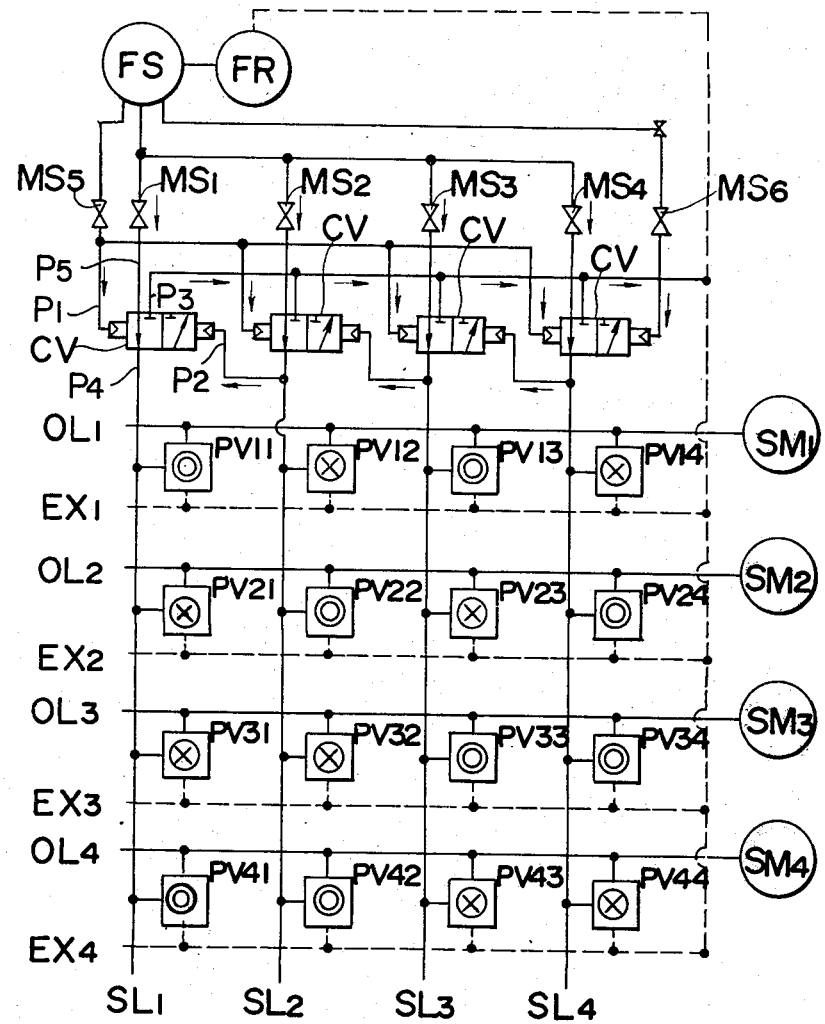
FIG. 12 is a schematic diagram showing another example of fluid circuit of the fluid logic programmer according to the present invention.
Figure 13:
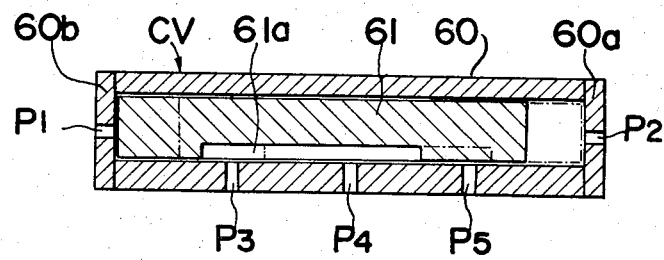
FIG. 13 is a longitudinal sectional view of a fluid flow control valve employed in the fluid circuit of FIG. 12.

In another example of the fluid logic programmer, shown in FIG. 12, the arrangement is made to automatically interrupt the supply of fluid to any of the supply pipes $SL_1$ to $SL_4$ when a succeeding one of the master valves $MS_1$ to $MS_4$ has been opened. For this purpose, a fluid flow control valve, generally indicated by CV, is disposed on each supply pipe $SL_1$ to $SL_4$ between the master valve and the first line of the outlet pipes $OL_1$ to $OL_4$. The details of the fluid flow control valve CV are shown in FIG. 13 and reference is, therefore, made to FIG. 13.

The fluid flow control valve CV comprises a cylindrical housing 60 having both ends closed by suitable closure members 60a and 60b, each of which is formed with a port P1 and P2 communicating between the interior of said housing 60 and the atmosphere. The cylindrical housing 60 is also formed with a plurality of ports P3, P4 and P5 preferably equidistantly spaced from each other and all communicating between the interior of the housing 60 and the atmosphere.

Slidably housed within the interior of the housing 60 is a plunger 61 having a substantially intermediate portion thereof formed with a lengthwisely extending groove 61a which selectively communicates between the ports P4 and P3 and between the ports P4 and P5 in response to movement of the plunger 61 within the interior of the housing 60. Although not shown, a suitable number of sealing rings may be mounted on the periphery of the plunger 61 for the purpose of avoiding fluid leakage and concurrently for the purpose of giving a friction to movement of the plunger 61 within the interior of the housing 60. In addition thereto, a compression spring (not shown) may be provided within the interior of the housing 60 between one end of the plunger 61 and the adjacent closure member 60a and 60b for biasing the plunger 61 in one direction.

Each fluid flow control valve CV of the above construction is, as shown in FIG. 12, disposed in such a manner that the port p1 is connected with the fluid source FS through a master valve $MS_5$ of the same type as any of the master valves $MS_1$ to $MS_4$; the passage between the ports P4 and P5 via the groove 61a is inserted in the supply pipe between the master valve and the fluid logic valve assembly; and the port P5 is connected with the fluid reservoir FS; and the port P2 of any of the fluid flow control valves CV except for that associated with the last row of the supply pipes on which the master valve $MS_4$ is disposed is connected to the port P5 of the next adjacent fluid flow control valve, the port P2 of the fluid flow control valve in the last row being connected with the fluid source FS through a master valve $MS_6$.

In the arrangement shown in FIG. 12, assuming that the master valve $MS_5$ is opened and, therefore, the plunger 61 is biased to the position in which the ports P4 and P5 are communicated to each other through the groove 61a, all of these fluid flow control valves CV are conditioned so as to permit the flow of fluid from the fluid source FS to each one of the supply pipes $SL_1$ to $SL_4$. While in this condition, if the master valve $MS_2$ is opened after the master valve $MS_1$ has been opened, flow of fluid under pressure from the fluid source FS to the supply pipe $SL_2$ through said valve $MS_2$ and then the fluid flow control valve CV is permitted on one hand and a portion of the fluid under pressure that has emerged from the fluid flow control valve associated with the supply pipe $SL_2$ is fed to the port P2 of the fluid flow control valve CV associated with the supply line $SL_1$ thereby causing the plunger 61 to move to the position as shown in FIG. 13 to permit the flow of fluid present in the supply pipe $SL_1$ so that the fluid pressure in said supply pipe $SL_1$ is resuced or otherwise relieved. At this time, communication between the ports P5 and P4 of the fluid flow control valve CV, associated with the supply pipe $SL_1$, has been interrupted.

A description similar to the one presented above may apply to any of the other fluid flow control valves associated with the supply pipes $SL_2$ to $SL_4$.

Although the present invention has been fully described by way of example, it should be noted that various changes and modifications are apparent to those skilled in the art. For example, the term "fluid" hereinbefore and in the following claims used should be understood as including any liquid medium such as oil, and water and air. Therefore, in the case where air is employed for the fluid, the fluid reservoir FR need not be provided. Instead thereof, the exhaust pipes should be open to the atmosphere. In addition, operation of each master valve $MS_1$ to $MS_4$ may be effected be any of other methods such as by the use of a mechanical or electrical actuator, by the use of a permanent magnet or by the use of fluid under pressure.

Therefore, unless otherwise they depart from the ture scope of the present inventionm such changes and modifications should be understood as included therein.

What is claimed is:

1. A fluid logic valve assembly comprising in combinations:

A. a first valve section comprising:

a first cylindrical block having first and second ends and an axial opening extending in alignment with the longitudinal axis of said first block, said axial opening being, at said first and second ends, enlarged in different diameters thereby forming first and second fluid chambers;

a third fluid chamber in axial alignment and communication with said second fluid chamber;

a plunger housed within said first fluid chamber;

said first fluid chamber with said plunger housed therein being confined by a first closure member connected to said first end of said first cylindrical block;

said first fluid chamber being communicated without said first block through a plurality of first passages formed in said first cylindrical block and extending radially outwardly from said first fluid chamber, with outer openings of said plurality of said first passages being communicated with each other by a first annular groove formed around said first cylindrical block;

said second chamber being communicated without said first block through a plurality of second passages formed in said cylindrical block and extending radially outwardly from said second fluid chamber, with outer openings of said plurality of said second passages being communicated with each other by a second annular groove formed around said first cylindrical block;

a hollow valving rod slidably and fluid tightly extending through said axial opening and having a first end situated within said first fluid chamber and a portion adjacent a second end thereof situated within said second fluid chamber;

said hollow valving rod having a third fluid passage formed therein in alignment with a longitudinal axis thereof, said third passage having a first end open towards said first fluid chamber and a second end open towards said third fluid chamber;

said second end of said hollow valving rod adjacent to said second end of said third fluid passage being formed with a radially outward flange forming a valving member means for selectively opening and closing communications between said second and third fluid chambers;

a first spring means positioned in said first fluid chamber for biasing said plunger toward said first end of said first block into a first position with said plunger abutting said first closure member;

a second spring means positioned in said third fluid chamber for biasing said hollow valving rod toward said first end of said first block into a first position with said flange of said hollow valving rod aubtting said second end of said first block and closing communication between said second and third fluid chambers;

there being a space between said first end of said hollow rod and said plunger when said hollow valving rod and said plunger are in said respective first positions; and an actuating member, having a first end rigidly connected with said plunger and a second end situated outside said first closure member, slidably extending through a through hole formed in said first closure member in alignment with said longitudinal axis of said first cylindrical block;

said actuating member being reciprocable along said longitudinal axis of said first block to cause said plunger to close communication between said third and first fluid chambers and open communication between said second and third fluid chambers;

B. a second valve section comprising:

a second cylindrical block having first and second ends and an axial opening extending in alignment with a longitudinal axis of said second block, said axial opening being, at said first and second ends, enlarged in different diameters to form fourth and fifth fluid chambers;

a piston slidably extending through said axial opening in said second cylindrical block and having a land on a first end thereof;

third spring means interposed between said land and a second closure member closing said second end of said second cylindrical block;

a plurality of fourth fluid passages formed in said second block and extending radially outwardly from said fourth fluid chamber, with outer openings of said plurality of fourth passages being communicated with each other by a third annular groove formed around said second block;

a plurality of fifth fluid passages formed in said second block and extending radially outwardly from said fifth fluid chamber, with outer openings of said plurality of fifth passages being communicated with each other by a fourth annular groove formed around said second block; and said second closure member and said piston forming a space therebetween within which space said third spring means is housed and which space is communicated with atmosphere through a hole formed in said second closure member and is of a sufficient size to permit said piston to move between first and second positions, said piston being normally biased in one direction by the action of said third spring means to said first position whereat said land of said piston is spaced farthest away from said second closure member;

said piston being actuatable by fluid pressure in said fifth fluid passages to said second position whereat said land of said piston is adjacent said second closure member;

C. coupler means for fixedly connecting said first end of said second block and said second end of said first block and separating said third and fourth fluid chambers, said coupler means and said second end of said first block defining therebetween said third fluid chamber, said coupler means having extending therethrough a sixth passage communicating said third and fourth fluid chambers and in axial alignment with the longitudinal axis of at least one of said hollow valving rod and said piston, a second end of said piston when said piston is in said first position abutting said coupler means and closing said sixth passage, said second end of said piston being spaced from said coupler means when said piston is in said second position, thus allowing communication between said third and fourth fluid chambers via said sixth passage; and D. a single housing having a cylindrical opening therethrough; said first and second blocks connected by said coupler means being positioned in said cylindrical opening; separate first, second, third and fourth port means extending through said housing for respectively providing fluid communication with said first, second, third and fourth annular grooves.

2. An assembly as claimed in claim 1, wherein said radially outward flange has a substantially convex-shaped cross section.

3. An assembly as claimed in claim 1, wherein said through hole in said first closure member has therein opposed guide grooves; said actuating member has opposed segmental projections slidably guided in said guide grooves when said plunger is in said first position thereof; said actuating member and said plunger being manually movable against said first spring means to a second position whereat said segmental projections are released from said guide grooves, and upon rotation of said actuating member to bring said projections out of alignment with said guide grooves said first spring means biases said plunger and said actuating member to a position with said projections abutting said first closure member; and further comprising first elastic seat means in said plunger for sealingly closing said first end of said third passage when said plunger and said actuating member are in said second position, and second elastic seat means in said second end of said first block for sealingly closing communication between said second and third fluid chambers when said hollow valving rod is in said first position thereof.

4. A fluid logic program device comprising in combination:

a plurality of fluid logic valve assemblies each comprising:

A. a first valve section comprising:

a first cylindrical block having first and second ends and aan axial opening extending in alignment with the longitudinal axis of said first block, said axial opening being, at said first and second ends, enlarged in different diameters thereby forming first and second fluid chambers;

a third fluid chamber in axial alignment and communcation with said second fluid chamber;

a plunger housed within said first fluid chamber;

said first fluid chamber with said plunger housed therein being confined by a first closure member connected to said first end of said first cylindrical block;

said first fluid chamber being communicated without said first block through a plurality of first passages formed in said first cylindrical block and extending radially outwardly from said first fluid chamber, with outer openings of said plurality of said first passages being communicated with each other by a first annular groove formed around said first cylindrical block;

said second chamber being commuciated without said first block through a plurality of second passages fromed in said cylindrical block and extending radially outwardly from said second fluid chamber, with outer openings of said plurality of said second passages being communicated with each other by a second annular groove formed around said first cylindrical block;

a hollow valving rod slidably and fluid tightly extending through said axial opening and having a first end situated within said first fluid chamber and a portion adjacent a second end thereof situated within said second fluid chamber;

said hollow valving rod having a third fluid passage formed therein in alignment with a longitudinal axis thereof, said third passage having a first end open towards said first fluid camber and a second end open towards said third fluid chamber;

said second end of said hollow valving rod adjacent to said second end of said third fluid passage being formed with a radially outward flange forming a valving member means for selectively opening and closing communication between said second and third fluid chambers;

a first spring means positioned in said first fluid chamber for biasing said plunger toward said first end of said first block into a first position with said plunger abutting said first closure member;

a second spring means positioned in said third fluid chamber for biasing said hollow valving rod toward said first end of said first block into a first position with said flange of said hollow valving rod abutting said second end of said first block and closing communication between said second and third fluid chambers;

there being a space between said first end of said hollow valving rod and said plunger when said hollow valving rod and said plunger are in said respective first position; and an actuating member, having a first end rigidly connected with said plunger and a second end situated outside said first closure member, slidably extending through a through hole formed in said first closure member in alignment with said longitudinal axis of said first cylindrical block;

said actuating member being reciprocable along said longitudinal axis of said first block to cause said plunger to close communication between said third and first fluid chambers and open communication between said second and third fluid chambers B. a second valve section comprising:

a second cylindrical block having first and second ends and an axial opening extending in alignment with a longitudinal axis of said second block, said axial opening being, at said first and second ends, enlarged in different diameters to form fourth and fifth fluid chambers;

a piston slidably extending through said axial opening in said second cylindrical block and having a land on a first end thereof;

third spring means interposed between said land and a second closure member closing said second end of said second cylindrical block;

a plurality of fourth fluid passages formed in said second block and extending radially outwardly from said fourth fluid chamber, with outer openings of said plurality of fourth passages being communicated with each other by a third annular groove formed around said second block;

a plurality of fifth fluid passages formed in said second block and extending radially outwardly from said fifth fluid chamber, with outer openings of said plurality of fifth passages being communicated with each other by a fourth annular groove formed around said second block; and said second closure member and said piston forming a space therebetween within which space said third spring means is housed and which space is communicated with atmosphere through a hole formed in said second closure member and is of a sufficient size to permit said piston to move between first and second positions, said piston being normally biased in one direction by the action of said third spring means to said first position whereat said land of said piston is spaced farthest away from said second closure member;

said piston being actuatable by fluid pressure in said fifth fluid passages to said second position whereat said land of said piston is adjacent said second closure member;

C. coupler means for fixedly connecting said first end of said second block and said second end of said first block and separating said third and fourth fluid chambers said coupler means having extending therethrough a sixth passage said coupler means and said second end of said first block defining therebetween said third fluid chamber, communicating said third and fourth fluid chambers and in axial alignment with the logitudinal axis of at least one of said hollow valving rod and said piston, a second end of said piston when said piston is in said first position abutting said coupler means and closing said sixth passage said second end of said piston being spaced from said coupler means when said piston is in said second position, this allowing communication between said third and fourth fluid chambers via said sixth passage; and D. a single housing having a cylindrical opening therethrough; said first and second blocks connected by said coupler means being positioned in said cylindrical opening; separate first, second, third and fourth port means extending through said housing for respectively providing fluid communication with said first, second, third and fourth annular grooves; and said housings of said plurality of fluid logic valve assemblies being integrally coupled, with said second and fourth port means of adjacent of said housings being in fluid communication.

5. A device as claimed in claim 4, wherein, for each of said fluid logic valve assemblies, said radially outward flange has a substantially convex-shaped cross section.

6. A device as claimed in claim 4, wherein for each of said fluid logic valve assemblies, said through hole in said first closure mmember has therein opposed guide grooves; said actuating member has opposed segmental projections slidably guided in said guide grooves when said plunger in in said first position thereof; said actuating member and said plunger being manually movable against said first spring means to a second position whereat said segmental projections are released from said guide grooves, and upon rotation of said actuating member to bring said projections out of alignment with said guide grooves said first spring means biases said plunger and said actuating member to a position with said projections abutting said first closure member; and further comprising first elastic seat means in said plunger for sealingly closing said first end of said third passage when said plunger and said actuating member are in said second position, and second elastic seat means in said second end of said first block for sealingly closing communication between said second and third fluid chambers when said hollow valving rod is in said first position thereof.

* * * * *